United States Patent
Liu et al.

(10) Patent No.: US 9,460,186 B2
(45) Date of Patent: Oct. 4, 2016

(54) DATABASE MANAGEMENT METHOD AND SYSTEM

(71) Applicant: Huawei Technologies Co., Ltd., Shenzhen (CN)

(72) Inventors: Huijun Liu, Beijing (CN); Zhongqing Xu, Shenzhen (CN); Junnan Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/956,666

(22) Filed: Dec. 2, 2015

(65) Prior Publication Data

US 2016/0092541 A1      Mar. 31, 2016

Related U.S. Application Data

(63) Continuation of application No. PCT/CN2014/076481, filed on Apr. 29, 2014.

(30) Foreign Application Priority Data

Sep. 12, 2013  (CN) .......................... 2013 1 0416229

(51) Int. Cl.
*G06F 17/30* (2006.01)

(52) U.S. Cl.
CPC ... *G06F 17/30584* (2013.01); *G06F 17/30463* (2013.01); *G06F 17/30477* (2013.01); *G06F 17/30554* (2013.01)

(58) Field of Classification Search
USPC .................. 707/705, 715; 711/173
See application file for complete search history.

(56) References Cited

U.S. PATENT DOCUMENTS

| 7,949,687 B1 | 5/2011 | Sinclair |
| 8,150,870 B1 | 4/2012 | Peddy et al. |

(Continued)

FOREIGN PATENT DOCUMENTS

| CN | 1517906 A | 8/2004 |
| CN | 101203019 A | 6/2008 |

(Continued)

OTHER PUBLICATIONS

"Generator (computer programming)," XP55266005, Retrieved from the Internet: URL: https://en.wikipedia.org/w/index.php?title=Generator_(computer_programming)&oldid=570231165 [retrieved on Apr. 15, 2016], Aug. 26, 2013, 10 pages.

(Continued)

*Primary Examiner* — Hung T Vy
(74) *Attorney, Agent, or Firm* — Conley Rose, P.C.; Grant Rodolph

(57) ABSTRACT

A database management method and system. The method includes dividing, by a database system, a data partition into a physical partition layer and a logical partition layer, wherein the logical partition segment and the physical partition segment are mapped to each other using a mapping relationship; receiving, by the database system, a data operation instruction of a user, and determining a logical partition segment to which a data record that is requested for operation by the data operation instruction belongs; determining, according to the data operation instruction and the mapping relationship, a physical partition segment that is corresponding to the determined logical partition segment and at the physical partition layer to perform an operation on the data record that is requested for operation by the data operation instruction.

14 Claims, 7 Drawing Sheets

(56) References Cited

U.S. PATENT DOCUMENTS

| | | |
|---|---|---|
| 2003/0115206 A1 | 6/2003 | Gilbert |
| 2004/0059700 A1 | 3/2004 | Park et al. |
| 2007/0124274 A1 | 5/2007 | Barsness et al. |
| 2007/0271211 A1 | 11/2007 | Butcher et al. |
| 2008/0114746 A1 | 5/2008 | Day et al. |
| 2008/0177975 A1* | 7/2008 | Kawamura ....... G06F 17/30339 711/173 |
| 2008/0263001 A1 | 10/2008 | Lohman et al. |
| 2009/0204782 A1 | 8/2009 | Barbarek et al. |
| 2010/0274780 A1 | 10/2010 | Galindo-Legaria et al. |
| 2010/0281027 A1 | 11/2010 | Duan et al. |
| 2011/0208784 A1 | 8/2011 | Butcher et al. |
| 2011/0225122 A1 | 9/2011 | Denuit et al. |
| 2012/0110592 A1 | 5/2012 | Shah et al. |
| 2012/0143823 A1 | 6/2012 | Jain et al. |
| 2012/0150815 A1 | 6/2012 | Pafumi et al. |
| 2012/0158722 A1 | 6/2012 | Gao et al. |
| 2012/0166402 A1 | 6/2012 | Pederson et al. |

FOREIGN PATENT DOCUMENTS

| | | |
|---|---|---|
| CN | 101315628 A | 12/2008 |
| CN | 101620600 A | 1/2010 |
| CN | 101876983 A | 11/2010 |
| CN | 102375779 A | 3/2012 |
| CN | 102541990 A | 7/2012 |
| CN | 102804183 A | 11/2012 |
| CN | 103473321 A | 12/2013 |
| EP | 0777884 B1 | 6/2004 |

OTHER PUBLICATIONS

"Query plan," XP055266011, Retrieved from the Internet: URL:http://en.wikipedia.org/w/index.php?title=Query_plan&oldid=568323598 [retrieved on Apr. 15, 2016], Aug. 31, 2013, 4 pages.

"Data manipulation language," XP55266005, Retrieved from the Internet: URL:https://en.wikipedia.org/w/index.php?title=data_manipulation_language&oldid=566758769 [retrieved on Apr. 15, 2016], Aug. 1, 2013, 2 pages.

"Defragmentation," XP055266041, Retrieved from the Internet: URL:http://en.wikipedia.org/w/index.php?title=Defragmentation&oldid=570538912 [retrieved on Apr. 15, 2016], Aug. 28, 2013, 8 pages.

Foreign Communication From a Counterpart Application, European Application No. 14843923.5, Extended European Search Report dated May 9, 2016, 16 pages.

Partial English Translation and Abstract of Chinese Patent Application No. CN103473321, Nov. 17, 2015, 4 pages.

Partial English Translation and Abstract of Chinese Patent Application No. CN101315628, Jan. 8, 2016, 20 pages.

Partial English Translation and Abstract of Chinese Patent Application No. CN101315628, Jan. 8, 2016, 24 pages.

Yuan, A., et al., "Research on Performance optimization of Oracle database," Oct. 2007, 64 pages.

English Translation of Yuan, A., et al., "Research on Performance optimization of Oracle database," Mar. 24, 2016, 2 pages.

Foreign Communication From A Counterpart Application, Chinese Application No. 201310416229.9, Chinese Office Action dated Dec. 30, 2015, 9 pages.

Foreign Communication From A Counterpart Application, PCT Application No. PCT/CN2014/076481, English Translation of International Search Report dated Aug. 4, 2014, 2 pages.

Foreign Communication From A Counterpart Application, PCT Application No. PCT/CN2014/076481, English Translation of Written Opinion dated Aug. 4, 2014, 8 pages.

* cited by examiner

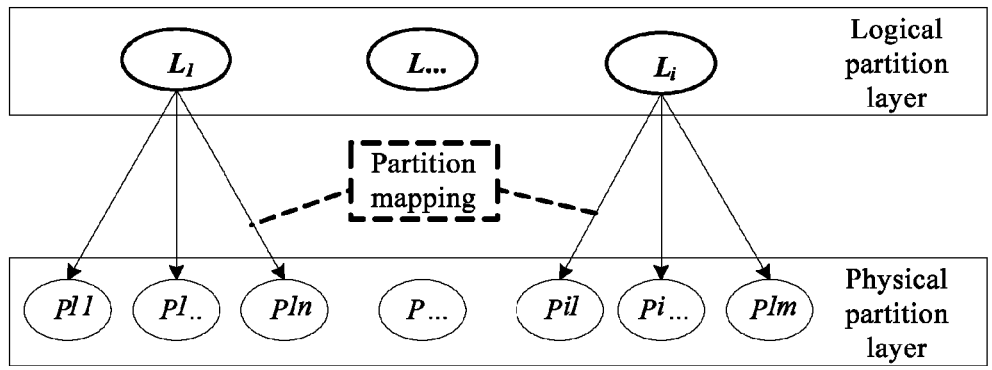

FIG. 1

```
┌─────────────────────────────────────────────────────────────┐
│  A database system divides a data partition into a physical │
│  partition layer and a logical partition layer, where the   │
│  physical partition lAyer is configured to store a physical │
│  partition segment of the database system, and the physical │
│  partition segment is a set of all data records in a        │
│  partition table; the logical partition layer is configured │  S201
│  to store a logical partition segment of the database       │
│  system, so as to provide logical partition information of  │
│  the partition table; and the logical partition segment and │
│  the corresponding physical partition segment are mapped to │
│  each other                                                 │
└─────────────────────────────────────────────────────────────┘
                              │
                              ▼
┌─────────────────────────────────────────────────────────────┐
│  The database system receives a data operation instruction  │
│  of a user, and determines a logical partition segment to   │  S202
│  which a data record that is requested for operation by the │
│  data operation instruction belongs                         │
└─────────────────────────────────────────────────────────────┘
                              │
                              ▼
┌─────────────────────────────────────────────────────────────┐
│  The database system, according to the data operation       │
│  instruction and the mapping relationship, a physical       │
│  partition segment that is corresponding to the determined  │  S203
│  logical partition segment and at the physical partition    │
│  layer, so as to perform an operation on the data record    │
│  that is requested for operation by the data operation      │
│  instruction                                                │
└─────────────────────────────────────────────────────────────┘
```

FIG. 2

DATABASE MANAGEMENT METHOD AND SYSTEM

CROSS-REFERENCE TO RELATED APPLICATIONS

This application is a continuation of International Application No. PCT/CN2014/076481, filed on Apr. 29, 2014, which claims priority to Chinese Patent Application No. 201310416229.9, filed on Sep. 12, 2013, both of which are hereby incorporated by reference in their entireties.

TECHNICAL FIELD

The present disclosure relates to database technologies, and in particular, to a database management method and system.

BACKGROUND

As an important function of a database system, partition is to divide and manage a large data table, which is indicated by a partition table, where the partition table may also include partition segments, and proper partitioning can improve performance of a database system, reduce the number of data read/write times of a system, and reduce a size of data processed by a database server, thereby facilitating database management. A partitioning policy is a cluster policy that design personnel sets for partitioning a large data table, where the partitioning policy specifies which partition segment a data record in the data table is mapped to. The database system further provides a data partition management function to implement partition management.

In the prior art, a database system supports three basic partitioning policies: range partitioning, list partitioning and hash partitioning, or supports other extended partitioning policies and combined partitioning policies. A partitioning policy and the number of partition segments impose a great impact on performance of a partition table. If a partition segment is too large, advantages of partitioning cannot be fully exerted, and if a partition segment is too small, there are too many partition tables, which increases time of query and optimization, and makes partition management more complex.

In the prior art, data partition management functions include adding a partition segment, deleting a partition segment (for range partitioning and list partitioning), reducing a partition segment (for hash partitioning), combining partition segments, splitting a partition segment, modifying a partition table name, and the like. When these management operations are implemented, data of a tuple of a partition may be modified, and the data may also be migrated between partition tables.

In the prior art, with the increase of data amount, partitioning performance and query performance are decreased due to improper partitioning; and for a management operation, higher data migration costs may be easily caused when partition segments are split or combined, and a part of partition segments or the whole partition table may be locked, which decreases system performance and is bad for database system management.

SUMMARY

Embodiments of the present disclosure provide a database management method and system, which can automatically adjust a partition according to a data change, reduce costs of partition adjustment, and improve properness of partitioning, and management performance of a database system.

According to a first aspect, an embodiment of the present disclosure provides a database management method, including dividing, by a database system, a data partition into a physical partition layer and a logical partition layer, where the physical partition layer is configured to store a physical partition segment of the database system, and the physical partition segment is a set of all data records in a partition table; the logical partition layer is configured to store a logical partition segment of the database system to provide logical partition information of the partition table; and the logical partition segment and the physical partition segment are mapped to each other using a mapping relationship; receiving, by the database system, a data operation instruction of a user, and determining a logical partition segment to which a data record that is requested for operation by the data operation instruction belongs; and determining, by the database system according to the data operation instruction and the mapping relationship, a physical partition segment that is corresponding to the determined logical partition segment and at the physical partition layer to perform an operation on the data record that is requested for operation by the data operation instruction.

In a first possible implementation manner of the first aspect, the method further includes performing, by the database system, properness determining on a current data partition according to partition information of the physical partition layer and partition information of the logical partition layer; and if it is determined that the current data partition is improper, adjusting, by the database system, the logical partition segment or physical partition segment that is improper.

According to the first aspect, or the first possible implementation manner of the first aspect, in a second possible implementation manner, the data operation instruction is a query instruction; and correspondingly, the determining, according to the data operation instruction and the mapping relationship, the physical partition segment that is corresponding to the determined logical partition segment and at the physical partition layer to perform an operation on the data record that is requested for operation by the data operation instruction includes receiving, by the database system, the query instruction, determining a partition table-based query condition according to the query instruction, performing partition pruning on the logical partition segment to exclude a logical partition segment not involved in query, and generating an execution plan; and determining, by the database system according to the execution plan, the query instruction, and the mapping relationship, the physical partition segment that is corresponding to the determined logical partition segment and at the physical partition layer to obtain a data record that is requested for query by the query instruction, and returning, to a user, the obtained data record as a query result.

According to the second possible implementation manner of the first aspect, in a third possible implementation manner, that the database system triggers, according to the execution plan, the logical partition layer to scan the corresponding physical partition segment at the physical partition layer according to the query instruction and the mapping relationship to execute a corresponding query operation includes cyclically obtaining, by the database system, a data record from the logical partition segment according to the execution plan and the query condition, and obtaining, according to the mapping relationship, a data record from the physical partition segment corresponding to the determined logical partition segment; and performing, by the database system, data screening on the obtained data record according to information in the query instruction, and returning, to the user, the data record that is obtained by the data screening and used as the query result.

According to the first aspect, or the first possible implementation manner of the first aspect, in a fourth possible implementation manner, the data operation instruction is an insert, delete or update instruction; and correspondingly, the determining, according to the data operation instruction and the mapping relationship, the physical partition segment that is corresponding to the determined logical partition segment and at the physical partition layer to perform an operation on the data record that is requested for operation by the data operation instruction includes determining, by the database system according to the insert, delete or update instruction, a data record to be inserted, deleted or updated; computing, by the database system according to a set in which the data record is located, the logical partition segment to which the data record belongs, and a physical partition segment corresponding to the logical partition segment; and executing, by the database system, an insert, delete or update operation on data within the physical partition segment obtained by the computing.

According to the first possible implementation manner of the first aspect, in a fifth possible implementation manner, the performing, by the database system, properness determining on a current data partition according to partition information of the physical partition layer and partition information of the logical partition layer, and if it is determined that the current data partition is improper, adjusting, by the database system, the logical partition segment or physical partition segment that is improper includes collecting, by the database system, database system running information related to partition adjustment, where the database system running information includes data information of tuples of both a logical partition and a physical partition, a data size of the logical partition segment and a data size of the physical partition segment, a structured query language (SQL) statement submitted to a database server by a peripheral and an execution frequency, and performance of executing an SQL statement by a database server; determining, by the database system using the database system running information, whether the current data partition is proper; and when it is determined that the current data partition is improper, replanning, by the database system, a partitioning scheme; and adjusting, by the database system, the logical partition segment and/or the physical partition segment according to the replanned partitioning scheme.

According to the fifth possible implementation manner of the first aspect, in a sixth possible implementation manner, the determining, by the database system using the database system running information, whether the current data partition is proper includes determining, by the database system according to an eigenvalue in the database system running information, whether the current data partition is proper, where the eigenvalue includes a data size upper limit of a partition segment, and an obliquity factor threshold; and if the eigenvalue exceeds a preset value of a corresponding eigenvalue, determining that the current data partition is improper.

According to the fifth possible implementation manner of the first aspect, in a seventh possible implementation manner, the adjusting, by the database system, the logical partition segment and/or the physical partition segment according to the logical partition layer and the physical partition layer that are obtained by recomputing includes adjusting, by the database system according to the replanned partitioning scheme, the logical partition layer by performing addition, deletion, combination or splitting on the logical partition segment, and/or adjusting the physical partition layer by splitting the physical partition segment.

According to the first aspect, and any one of the first to seventh possible implementation manners of the first aspect, in an eighth possible implementation manner, one logical partition segment corresponds to one or more physical partition segments.

According to a second aspect, an embodiment of the present disclosure provides a database system, including a physical partition layer configured to store a physical partition segment of the database system, where the physical partition segment is a set of all data records in a partition table; a logical partition layer configured to store a logical partition segment of the database system to provide logical partition information of the partition table, where the logical partition segment and the physical partition segment are mapped to each other using a mapping relationship; and a processing module configured to receive a data operation instruction of a user, and determine a logical partition segment to which a data record that is requested for operation by the data operation instruction belongs; and determine, according to the data operation instruction and the mapping relationship, a physical partition segment that is corresponding to the determined logical partition segment and at the physical partition layer to perform an operation on the data record that is requested for operation by the data operation instruction.

In a first possible implementation manner of the second aspect, the system further includes a partition management apparatus configured to perform properness determining on a current data partition according to collected partition information of the physical partition layer and collected partition information of the logical partition layer; and if it is determined that the current data partition is improper, adjust the logical partition segment or physical partition segment that is improper.

According to the second aspect or the first possible implementation manner of the second aspect, in a second possible implementation manner, the data operation instruction is a query instruction, and correspondingly, the processing module includes a query optimizer configured to receive the query instruction, determine a partition table-based query condition according to the query instruction, perform partition pruning on the logical partition segment to exclude a logical partition segment not involved in query, and generate an execution plan; and an execution engine configured to, according to the execution plan generated by the query optimizer, trigger the logical partition layer to determine, according to the query instruction and the mapping relationship, the physical partition segment that is corresponding to the determined logical partition segment and at the physical partition layer to obtain a data record that is requested for query by the query instruction, and return, to a user, the obtained data record as a query result.

According to the second possible implementation manner of the second aspect, in a third possible implementation manner, the execution engine is configured to cyclically obtain a data record from the logical partition segment according to the execution plan generated by the query optimizer and the query condition, and obtain, according to the mapping relationship, a data record from the physical partition segment corresponding to the determined logical partition segment; and perform data screening on the obtained data record according to information in the query instruction, and return, to the user, the data record that is obtained by the data screening and used as the query result.

According to the second aspect or the first possible implementation manner of the second aspect, in a fourth possible implementation manner, the data operation instruction is an insert, delete or update instruction; and correspondingly, the processing module is configured to determine, according to the insert, delete or update instruction, a data record to be inserted, deleted or updated; compute, according to a set in which the data record is located, the logical partition segment to which the data record belongs, and a physical partition segment corresponding to the logical partition segment; and execute, according to the logical partition layer, an insert, delete or update operation on a data record within the physical partition segment obtained by the computing.

According to the first possible implementation manner of the second aspect, in a fifth possible implementation manner, the partition management apparatus includes a partition information collecting unit configured to collect database system running information related to partition adjustment, where the database system running information includes data information of tuples of both a logical partition and a physical partition, a data size of the logical partition segment and a data size of the physical partition segment, an SQL statement submitted to a database server by a peripheral and an execution frequency, and performance of executing an SQL statement by a database server; a partition deciding unit configured to determine, using the database system running information, whether a current data partition is proper; and when it is determined that the current data partition is improper, replan a partitioning scheme; and a partition adjusting unit configured to adjust the logical partition segment and/or the physical partition segment according to the replanned partitioning scheme.

According to the fifth possible implementation manner of the second aspect, in a sixth possible implementation manner, the partition deciding unit is configured to determine, according to an eigenvalue in the database system running information collected by the partition information collecting unit, whether the current data partition is proper, where the eigenvalue includes a data size upper limit of a partition segment, and an obliquity factor threshold; and if the eigenvalue exceeds a preset value of a corresponding eigenvalue, determine that the current data partition is improper.

According to the fifth possible implementation manner of the second aspect, in a seventh possible implementation manner, the partition adjusting unit is configured to adjust, according to the replanned partitioning scheme, the logical partition layer by performing addition, deletion, combination or splitting on the logical partition segment, and/or perform adjustment by splitting the physical partition segment.

According to the second aspect and any one of the first to seven possible implementation manners of the second aspect, in an eighth possible implementation manner, one logical partition segment corresponds to one or more physical partition segments.

In the database management method and system according to the embodiments of the present disclosure, a data partition is divided into a physical partition layer and a logical partition layer; a logical partition segment and a corresponding physical partition segment are mapped to each other; and the logical partition layer can respond, by scanning the corresponding physical partition segment at the physical partition layer, to an operation that is performed on the corresponding physical partition segment by a query optimizer, an execution engine, and a partition management apparatus. In the embodiments of the present disclosure, using a hierarchy method for dividing a data partition into a physical partition layer and a logical partition layer, large-scale data migration caused by partition adjustment can be avoided, thereby reducing costs of partition adjustment.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

FIG. 1 is a schematic structural diagram of a hierarchically partitioned database;

FIG. 2 is a flowchart of Embodiment 1 of a database management method according to the present disclosure;

DESCRIPTION OF EMBODIMENTS

Figure 3:
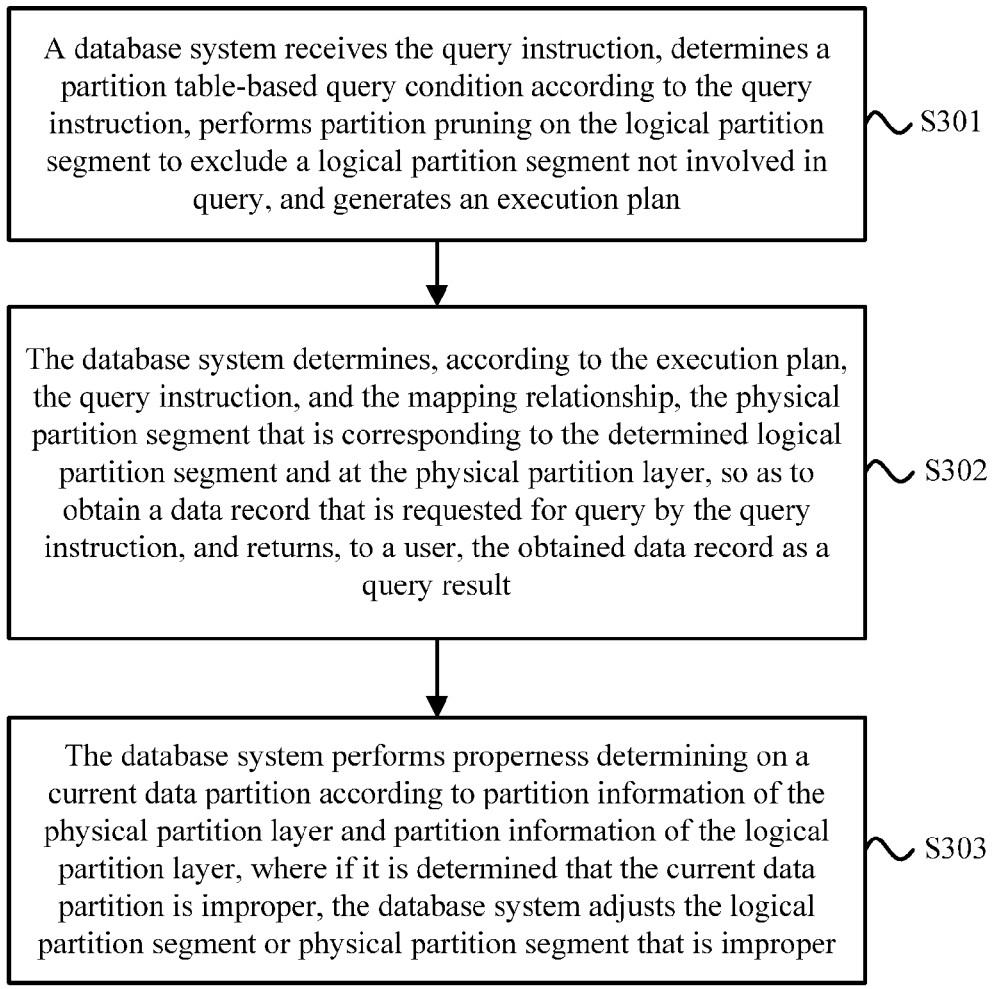
FIG. 3 is a flowchart of Embodiment 2 of a database management method according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

In a database system, whether data partitioning is proper directly affects performance of the database system. When a database administrator (DBA) uses an improper partitioning scheme, the database system may have quite low performance. In addition, with the increase of data amount in the database system, a proper partitioning scheme may become improper; therefore, the partitioning scheme needs to be readjusted. In a database management method in the prior art, during partition adjustment, for example, when partition subtables are split or combined, higher costs of data migration are caused due to a larger amount of data involved.

A database system may include a partition management apparatus, a query optimizer and an execution engine.

Data partitioning may be implemented by the partition management apparatus.

The query optimizer is a functional part of an SQL engine of a database system and generates an execution plan for a data manipulation language (DML) statement. The execution engine may be an execution engine of the database system, and the execution engine receives the execution plan from the query optimizer, and executes an operation, such as query, insert, delete or update.

An embodiment of the present disclosure provides a database management method of a data partition, where a data partition is divided into a physical partition layer and a logical partition layer. FIG. 1 is a schematic structural diagram of a hierarchically partitioned database. As shown in FIG. 1, data records in a data table are clustered physically according to a physical partitioning policy, that is, a physical partition segment, and are clustered logically according to a logical partitioning policy, that is, a logical partition segment. The logical partition layer is above the physical partition layer, and one logical partition segment may correspond to one or more physical partition segments. For example, in FIG. 1, data at the logical partition layer is $L_1$, $L_2 \ldots$ to $L_i$, where i is an integer greater than 1; and data that is corresponding to $L_1$ and at a physical partition layer is $P_{11} \ldots$ to $P_{1n}$, and data corresponding to $L_i$ is $P_{i1} \ldots$ to $P_{im}$, where both n and m are integers greater than 0.

Functions and attributes of the physical partition layer and the logical partition layer are as follows.

The physical partition layer embodies a manner in which data records in a data table are clustered on a storage medium. Data records in a partition table are clustered on the storage medium according to a physical partitioning policy. The physical partitioning policy and a partition granularity are decided by the partition management apparatus. The functions of the physical partition layer include storing a physical partition segment; performing an add, delete, query or modify operation on data in a physical partition according to an instruction of the logical partition layer; and performing a management operation, such as create, delete, split, or combine, on a physical partition table according to an instruction of the partition management apparatus.

The query optimizer and the execution engine in the database system do not perform a direct operation on the physical partition layer.

The logical partition layer embodies a manner in which tuples of a data table are clustered logically. A logical partitioning policy is closely related to a physical partitioning policy, and the logical partitioning policy is limited by the physical partitioning policy. One logical partition segment may be mapped to one or more physical partition segments; and conversely, one physical partition segment available for an upper layer can be surely mapped to one and only one logical partition segment. In other words, the number of logical segments at the logical partition layer is smaller than the number of physical partitions segment at the physical partition layer.

The functions of the logical partition layer include providing the query optimizer with logical partition information of a partition table as a basis for partition pruning; when a database server executes a query statement, the logical partition layer providing the execution engine with services executing sequence scanning or index scanning on the logical partition segment; responding to a request of the execution engine by scanning a physical partition segment which is at the physical partition layer and to which the logical partition segment is mapped; when the database server executes an operation, such as insert, delete or update, the logical partition layer executing an operation, such as insert, delete or update on a tuple of the logical partition segment according to an instruction of the execution engine; the logical partition layer implementing, using a data record route, an operation, such as insert, delete or update, on a physical partition segment; and according to an instruction of the partition management apparatus, collecting logical partition information, and performing a management operation, such as create, delete, combine or delete, on a logical partition table.

It can be seen that a management operation on the logical partition table by the partition management apparatus only involves modifying of metadata of the logical partition; therefore, management costs are relatively low.

The following describes a database management method according to an embodiment of the present disclosure. FIG. 2 is a flowchart of Embodiment 1 of a database management method according to the present disclosure. The method of this embodiment is executed by a database system. As shown in FIG. 2, the method may include the following steps.

S201. A database system divides a data partition into a physical partition layer and a logical partition layer, where the physical partition layer is configured to store a physical partition segment of the database system, and the physical partition segment is a set of all data records in a partition table; the logical partition layer is configured to store a logical partition segment of the database system to provide logical partition information of the partition table; and the logical partition segment and the corresponding physical partition segment are mapped to each other.

S201 may be performed by a partition management apparatus in the database system.

First, meanings of the following terms are explained. Tuple: indicates one data record in a relational data table. Partition table: indicates a logically complete data table in the data partition. Partition key: indicates one or more columns that are of a data table and used by a partitioning policy in data partitioning, and a partition key is used for executing data clustering according to a certain interval value or range value, a specific value list, or a hash function value. Partition segment: A segment obtained by dividing a partition table according to a partitioning policy, and the partition segment includes a physical partition segment or a logical partition segment.

The physical partition layer embodies a manner in which tuples of a data table are clustered on a storage medium. Tuples of a partition table are clustered on the storage medium according to a physical partitioning policy. The physical partitioning policy and a partition granularity are decided by the partition management apparatus, where the partition granularity represents a partitioning unit, for example, a month or a year.

The logical partition layer embodies a manner in which tuples of a data table are clustered logically. In addition, a logical partitioning policy is closely related to a physical partitioning policy, and the logical partitioning policy is limited by the physical partitioning policy. One logical partition segment may be mapped to one or more physical partition segments; and conversely, one physical partition segment available for an upper layer can be surely mapped to one and only one logical partition segment. That is, the number of logical segments at the logical partition layer is smaller than the number of physical partition segments at the physical partition layer, and during implementation, the partition management apparatus may control sizes of all logical partition segments to be consistent to facilitate management.

S202. The database system receives a data operation instruction of a user, and determines a logical partition segment to which a data record that is requested for operation by the data operation instruction belongs.

S203. Determine, according to the data operation instruction and the mapping relationship, a physical partition segment that is corresponding to the determined logical partition segment and at the physical partition layer to perform an operation on the data record that is requested for operation by the data operation instruction.

More specifically, the logical partition layer may perform an operation on the corresponding physical partition segment according to an instruction of the query optimizer, the execution engine, and the partition management apparatus in the database system.

Services provided for the query optimizer by the logical partition layer include providing the query optimizer with logical partition information of the partition table as a basis for partition pruning, where the partition pruning is a technology closely related to a partitioning method, for example, performing partition pruning on the logical partition segment may exclude a logical partition segment not involved in query. The partition pruning technology is applied to that query in a partition table is mapped to query in a few partition segments.

Services provided for the execution engine by the logical partition layer include, for example, when the database server executes a query statement, the logical partition layer executing sequence scanning or index scanning on the logical partition segment; and the logical partition layer responding to a request of the execution engine by scanning a physical partition segment which is at the physical partition layer and to which the logical partition segment is mapped. Further, the logical partition layer may also use a method, such as physical partition pruning, to improve performance of scanning the physical partition segment, thereby further improving query performance.

The services provided for the execution engine by the logical partition layer include, for example, when the database server inserts, deletes or updates a tuple statement, the execution engine executing an insert, delete or update operation on a tuple of the logical partition segment through the logical partition layer; and the logical partition layer implementing a tuple insert, delete or update operation on a physical partition segment using a tuple route.

Services provided for the partition management apparatus by the logical partition layer include, for example, collecting logical partition information and performing a management operation, such as create, delete, combine, or split, on the logical partition table. The management operation on the logical partition table only involves modifying of data of a tuple in the logical partition; therefore, a management cost is relatively low.

Functionally, the physical partition layer provides the following services: storing a physical partition segment; providing a service for the logical partition layer, for example, executing a query/insert/delete/update operation on a tuple in a physical partition; and providing a service for the partition management apparatus, for example, performing a management operation, such as create, delete, split, or combine, on the physical partition table.

The physical partition layer is invisible to the query optimizer and the execution engine, and the physical partition layer establishes a connection to the query optimizer and the execution engine through the logical partition layer.

In the database management method according to the embodiment of the present disclosure, a data partition is divided into a physical partition layer and a logical partition layer; a logical partition segment and a corresponding physical partition segment are mapped to each other; and the logical partition layer can respond, by scanning the corresponding physical partition segment at the physical partition layer, to an operation that is performed on the corresponding physical partition segment by a query optimizer, an execution engine, and a partition management apparatus. In the embodiment of the present disclosure, using a hierarchy method for dividing a data partition into a physical partition layer and a logical partition layer, large-scale data migration caused by partition adjustment can be avoided, thereby reducing costs of partition adjustment.

FIG. 3 is a flowchart of Embodiment 2 of a database management method according to the present disclosure. In this embodiment, the data operation instruction is a query instruction. Further, this embodiment further includes a method for automatically adjusting a database partition. As shown in FIG. 3, on the basis of the embodiment shown in FIG. 2, the method of this embodiment, for a query operation, may include the following steps.

S301. A database system receives the query instruction, determines a partition table-based query condition according to the query instruction, performs partition pruning on the logical partition segment to exclude a logical partition segment not involved in query, and generates an execution plan.

S301 may be performed by a query optimizer in the database system, and the query optimizer is a functional part of a database system SQL engine, and generates the execution plan for a DML statement. A partition table-related function includes, for example, executing partition pruning on a query statement, or on a query part in an insert, delete, or update tuple statement. In this case, the partition pruning is only for a logical partition. During the partition pruning, the query optimizer does not perform an operation on a physical partition layer directly. The partition pruning herein is determining, according to a query condition for a partition table and at an execution plan generating stage, which logical partition segment is not involved in query, and pruning, at the execution plan generating stage the logical partition segment not involved in query. Partition pruning can greatly improve query performance.

S302. The database system determines, according to the execution plan, the query instruction, and the mapping relationship, the physical partition segment that is corresponding to the determined logical partition segment and at the physical partition layer to obtain a data record that is requested for query by the query instruction, and returns, to a user, the obtained data record as a query result.

S302 may be performed by an execution engine in the database system, and the execution engine executes, according to the executing plan generated by the query optimizer, a corresponding query operation on the logical partition segment.

It can be understood that when a data operation instruction is an operation, such as insert, delete or update, because a data record to be operated also needs to be first queried, the foregoing method for the query instruction may also be used for a query part in the operation, such as insert, delete, or update.

Further, the database system may further perform automatic management on a data partition, which may include the following step.

S303. The database system performs properness determining on a current data partition according to partition information of the physical partition layer and partition information of the logical partition layer; and if it is determined that the current data partition is improper, the database system adjusts the logical partition segment or physical partition segment that is improper.

S303 may be performed by a partition management apparatus in the database system. Whether the data partition is proper may be determined using a group of eigenvalues, where the group of eigenvalues is:

(1) Partition segment size upper limit: A size of a partition segment may be defined as the number of tuples included in a partition segment, or a size occupied by a partition segment in storage space. When a size of a certain logical partition segment is greater than a size upper limit, the logical partition segment must be split into smaller logical partition segments. A size upper limit of a logical partition segment is specified by the database system, or specified by a person defining a partition table.

(2) Obliquity factor threshold: An obliquity factor of two partition segments indicates a ratio of a table with a larger size to a table with a smaller size in a data size; and if the obliquity factor of two partition segments is greater than an obliquity factor threshold, it is considered that data obliquity occurs in the data partition, and the data partition needs to be adjusted.

A properness determining result for data partitioning is classified into properness and improperness, where improperness of partitioning includes three types of improperness results: logical partition overflow, physical partition overflow, and logical partition obliquity.

The partition management apparatus provides the following services.

When a partition table is created, the partition management apparatus determines a partitioning policy and a partition granularity for the partition table according to a data type of a partition key and a default setting; and optionally, a DBA may also specify a partitioning policy and a partition granularity when a partition table is created.

During a running process of the database system, the partition management apparatus conditionally triggers (by triggering at regular intervals, a change of a certain key index in a system, or the like), a partition analysis process, and the partition management apparatus determines whether a current partition is proper according to real-time system running information. If the current partition is improper, the partition management apparatus decides a new partitioning policy, and adjusts, according to the new partitioning policy, the logical partition segment or physical partition segment that is improper to implement automatic management on the data partition.

In the database management method according to the embodiment of the present disclosure, a query optimizer and an execution engine in a database system perform a database management operation, such as insert, delete or update, on a corresponding physical partition segment using the logical partition segment, which can improve the database management efficiency; and a partitioning calendar apparatus in the database system may automatically adjust a partition according to a data change, which can improve properness of partitioning and management performance of a database system.

Figure 4:
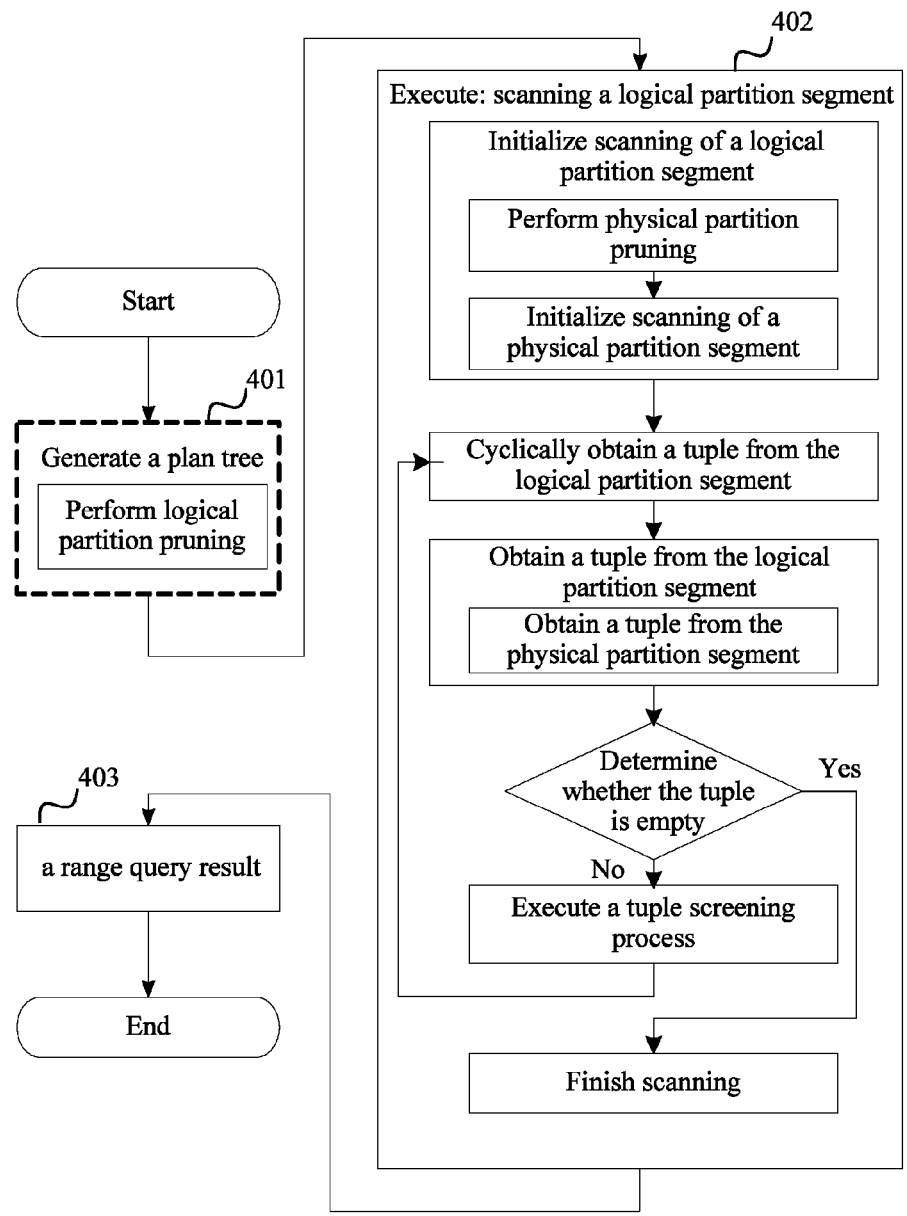
FIG. 4 is a schematic diagram of a process of applying a database management method to a query operation according to the present disclosure.

FIG. 4 is a schematic diagram of a process of applying a database management method to a query operation according to the present disclosure. As shown in FIG. 4, this embodiment describes in detail a process (S301 and S302) of implementing a query operation according to the method of Embodiment 2. The method of this embodiment may include the following steps.

S401. Generate a plan tree.

S401 may be performed by a query optimizer in a database system.

For example, after query is started, the query optimizer first performs SQL parsing to parse an original SQL statement generation parsing tree; and then generates a plan tree, that is, the plan tree is generated by the parsing tree. S401 further includes performing logical partition pruning on a partition table according to a query condition to exclude a logical partition segment not involved in query.

S402. Execute scanning of a logical partition segment.

S402 may be performed by an execution engine in the database system, and a logical partition layer and a physical partition layer.

The execution engine cyclically obtains a data record from the logical partition segment according to a preset scanning and filtering condition, and the logical partition segment obtains a data record from a corresponding physical partition segment.

For a query execution process, a scanning operation on the partition table is mainly described, and includes initializing scanning of a logical partition segment, and setting a scanning and filtering condition, where performing physical partition pruning according to the scanning and filtering condition is included. In addition, a process of initializing scanning of a logical partition segment is implemented by initializing scanning of a bottom-layer physical partition segment; therefore, setting the scanning and filtering condition is to set a scanning and filtering condition for the physical partition segment.

A tuple is cyclically obtained from the logical partition segment. The logical partition layer is implemented by obtaining a tuple from the physical partition segment, for example, obtaining one tuple from the logical partition segment is to obtain one tuple from a corresponding physical partition segment.

Whether the tuple is empty is determined, and if the tuple is empty, a scanning process ends, and in this case, a cycling process ends, and scanning is complete.

If the tuple is not empty, a tuple screening process is executed, where a screening result is used as an input for subsequent computation; and a next tuple is obtained.

S403. Obtain a query result, that is, obtain, by screening, a data record for subsequent computation as an obtained query result.

S403 may be performed by the query optimizer in the database system.

For example, the query result in S403 may be obtaining a range query result and returning a query result set.

So far, the whole query process ends.

According to this embodiment, a data record may be obtained from the logical partition segment and a corresponding physical partition segment according to a preset scanning and filtering condition, thereby implementing a query process of the data record.

Figure 5:
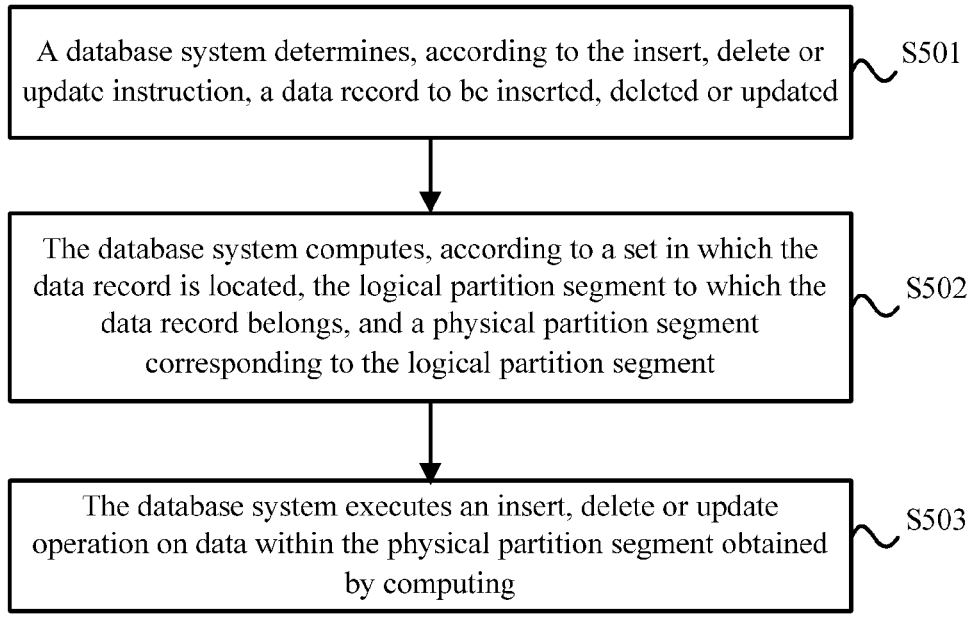
FIG. 5 is a flowchart of Embodiment 3 of a database management method according to the present disclosure.

FIG. 5 is a flowchart of Embodiment 3 of a database management method according to the present disclosure. In this embodiment, the data operation instruction is an insert, delete or update instruction. As shown in FIG. 5, on the basis of the embodiment shown in FIG. 2, the method of this embodiment, for the insert, delete or update instruction, may include the following steps.

S501. A database system determines, according to the insert, delete or update instruction, a data record to be inserted, deleted or updated.

More specifically, the database system may compute, according to the insert, delete or update instruction, a tuple to be inserted, deleted or updated. For example, a tuple obtaining method is that a user directly inputs a tuple (for example, inserting a new tuple), such that a tuple can be obtained after an SQL statement is parsed; and another tuple obtaining method is to obtain a tuple from a data table by query (for example, conditional updating), and in this case, computing a target tuple that needs to be obtained is the same as a query process.

S502. The database system computes, according to a set in which the data record is located, the logical partition segment to which the data record belongs, and a physical partition segment corresponding to the logical partition segment.

More specifically, the database system may compute, according to a partition key value of a tuple, a logical partition segment to which the tuple belongs; and determine, according to a logical partitioning policy and a mapping relationship, the physical partition segment corresponding to the logical partition segment of the tuple.

During an actual operation, S501 and S502 may be similar to query operations of S301 and S302 in Embodiment 2.

S503. The database system executes an insert, delete or update operation on data within the physical partition segment obtained by the computing.

More specifically, the execution engine sends a tuple insert, delete or update request to a logical partition layer, and the logical partition layer computes, according to the partition key value of the tuple, a physical partition segment to which the logical partition segment is mapped, and submits the insert, delete or update request to the physical partition layer for implementation.

According to the embodiment of the present disclosure, a data record may be obtained from the logical partition segment and the corresponding physical partition segment to implement an insert, delete or update operation process on the obtained data record.

Figure 6:
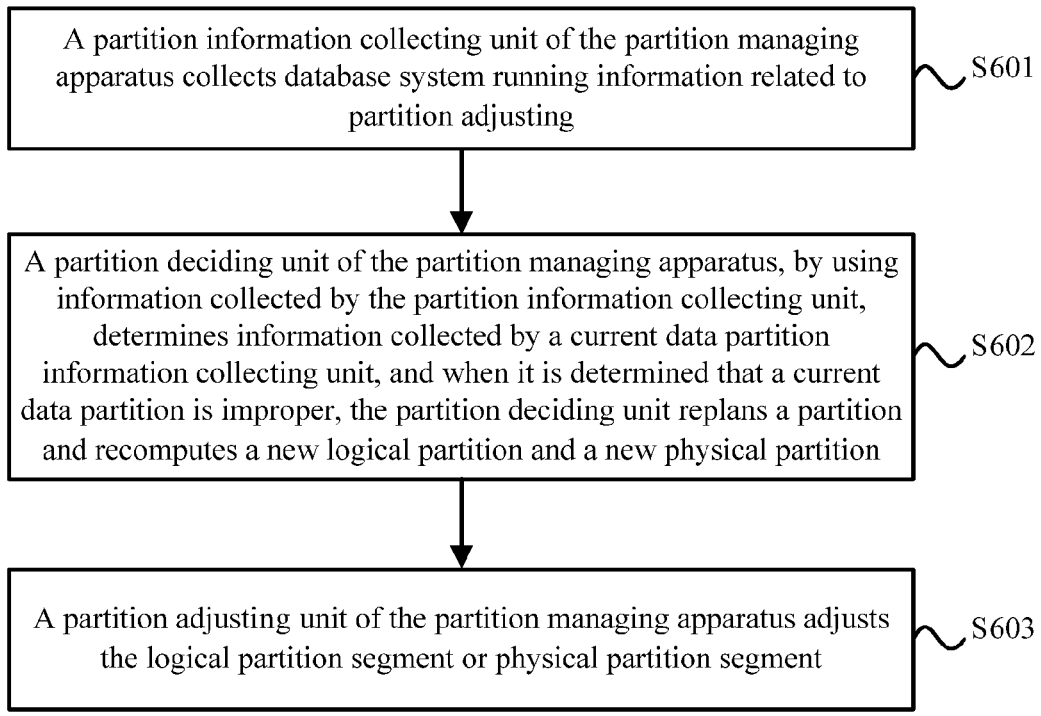
FIG. 6 is a flowchart of Embodiment 4 of a database management method according to the present disclosure.

FIG. 6 is a flowchart of Embodiment 4 of a database management method according to the present disclosure. As shown in FIG. 6, this embodiment describes in detail a process of implementing automatic partition management according to the method of Embodiment 2.

A partition management apparatus implements automatic management on a data partition, which includes the following steps.

S601. A partition information collecting unit of a partition management apparatus collects database system running information related to partition adjustment.

The collected information includes data information of tuples of both a logical partition and a physical partition, a data size of the logical partition segment and a data size of the physical partition segment, an SQL statement submitted to a database server by a peripheral and an execution frequency, and performance of executing an SQL statement by the database server; and the information is a decision basis for a partition deciding unit.

S602. When a partition deciding unit of the partition management apparatus determines, using the information collected by the partition information collecting unit, that a current data partition is improper, the partition deciding unit replans a partition and recomputes a new logical partition and a new physical partition.

More specifically, if the current partition is proper, the data partition adjusting procedure ends; and if the current partition is improper, the partition deciding unit recomputes a proper data partition according to current partition information.

S603. A partition adjusting unit of the partition management apparatus adjusts the logical partition segment or physical partition segment.

After the partition adjusting unit executes an adjustment process on a logical data partition or a physical data partition, the data partition adjustment ends.

Preferably, the database server automatically triggers a data partition adjustment process according to certain logic, for example, in a manner of triggering at regular intervals, that the partition adjusting unit adjusts the data partition includes determining, according to the collected information, whether the current data partition is proper; and if the current data partition is improper, recomputing, by the partition deciding unit, a proper data partition according current partition information; and adjusting, by the partition adjusting unit, the logical data partition segment or physical data partition segment, more specifically, adjusting the logical partition segment by modifying data of a logical partition tuple when addition, deletion, combination, or splitting is performed on the logical partition segment, or adjusting the physical partition segment by splitting a physical partition.

More specifically, if the partition deciding unit determines that the data partition needs to be adjusted, the partition adjustment process is implemented by the partition adjusting unit.

Partition adjustment is classified into two types.

In most cases, the adjustment only involves a logical partition, and includes addition, deletion, combination, splitting, or the like of a logical partition segment. For the adjustment on the logical partition, only data of the logical partition tuple needs to be modified, with no need to perform data migration between partition segments.

In a few cases, adjusting only the logical partition cannot meet a performance requirement completely, for example, with long-term on-line operation of a production system, a size of a physical partition segment is gradually increased, thereby affecting query performance. In this case, the physical partition needs to be adjusted, and adjustment on the physical partition is mainly splitting the physical partition.

Data migration is not required during logical partition adjustment, and physical partition adjustment often involves data migration. A part of partition segments are not available within a period of time due to data migration. Therefore, costs for logical partition adjustment are much lower than costs for physical partition adjustment.

In addition, compared with a conventional non-hierarchical partitioning technology, a physical partition granularity in a hierarchical data partition is relatively small, and the data amount affected by adjustment is relatively small, thereby improving data availability.

Figure 7:
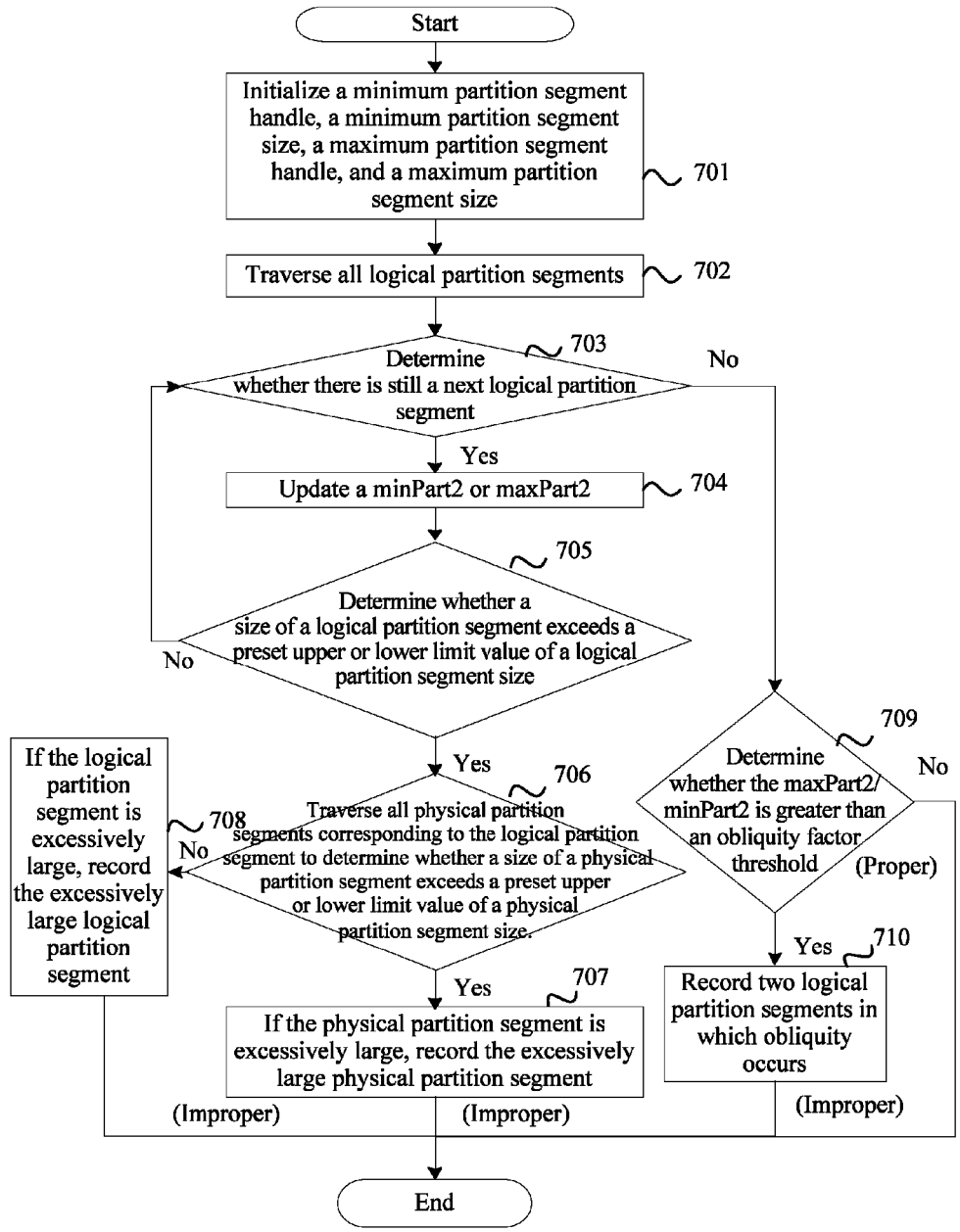
FIG. 7 is a schematic diagram of a process of determining properness of data partitioning according to the embodiment shown in FIG. 6.

FIG. 7 is a schematic diagram of a process of determining properness of data partitioning according to the embodiment shown in FIG. 6. This embodiment describes in detail the process of determining properness of data partitioning in an automatic management implementation process in the foregoing embodiments.

This embodiment describes a process of determining properness of data partitioning to prove that the present disclosure is implementable. However, the idea of the present disclosure is not limited thereto. Using another embodiment that describes a process different from that in this embodiment does not affect protection on an idea of hierarchy of a data partition, and a data partition adjustment process.

Preferably, the partition deciding unit determines, according to an eigenvalue in the information collected by the partition information collecting unit, whether the current data partition is proper, where the eigenvalue includes a data size upper limit of a partition segment, and an obliquity factor threshold; and if the eigenvalue exceeds a preset value of a corresponding eigenvalue, determines that the current data partition is improper.

More specifically, properness determining for data partitioning uses a group of eigenvalues as a basis, where the group of eigenvalues is:

(1) Partition segment size upper limit: A size of a partition segment may be defined as the number of tuples included in a partition segment, or a size occupied by a partition segment in storage space; and includes a size of a logical partition segment and a size of a physical partition segment. For example, when a size of a certain logical partition segment is greater than a size upper limit of a logical partition segment, the logical partition segment may be split into smaller logical partition segments; a size upper limit of a logical partition segment may be specified by the database system, or specified by a person defining a partition table; and a size of a physical partition segment is defined in the same principle.

(2) Obliquity factor threshold: An obliquity factor of two partition segments indicates a ratio of a size value of a table with a larger size to a size value of a table with a smaller size in the size of the logical partition segment; and if the obliquity factor of two logical partition segments is greater than an obliquity factor threshold, it is considered that data obliquity occurs in the data partition, and the data partition needs to be adjusted.

A properness determining result for data partitioning is classified into properness and improperness, where improperness of partitioning includes three types of improperness results: logical partition overflow, physical partition overflow, logical partition obliquity, which may respectively correspond to that a size of a logical partition segment exceeds a limit value, that a size of a physical partition segment exceeds a limit value, and that an obliquity factor of two logical partition segments is greater than an obliquity factor threshold.

As shown in FIG. 7, a process of determining properness of data partitioning includes, after the determining is started, executing the following steps.

S701. Initialize a minimum partition segment handle, a minimum partition segment size, a maximum partition segment handle, and a maximum partition segment size.

For example, a minimum partition segment size is set to minPart=MAX, and a maximum partition segment size is set to maxPart=0, where the initialization includes initialization of a maximum or minimum physical partition segment handle, and a maximum or minimum physical partition segment size minPart1 or maxPart1, and initialization of a maximum or minimum logical partition segment handle, and a maximum or minimum logical partition size minPart2 or maxPart2.

S702. Traverse all logical partition segments.

S703. Determine whether there is still a next logical partition segment, where if it is empty, that is, there is no next logical partition segment, turn to perform S709; and if there is a next logical partition segment, perform S704.

S704. Update the minPart2 or maxPart2.

For example, if a size of the logical partition segment is smaller than the minimum logical partition segment size minPart2, the minimum logical partition segment handle and the minimum logical partition segment size minPart2 are updated; otherwise, if the size of the logical partition segment is greater than the maximum logical partition segment size maxPart2, the maximum logical partition handle and the maximum logical partition segment size maxPart2 are updated.

S705. Determine whether a size of a logical partition segment exceeds a preset upper or lower limit value of a logical partition segment size.

For example, if the size of the logical partition segment is not greater than the maximum logical partition segment size maxPart2, that is, the size of the logical partition does not exceed the preset upper or lower limit value of the logical partition size, it is determined that the logical partition segment is proper, and S703 is performed; otherwise, if the logical partition size exceeds the preset upper or lower limit value of the logical partition size, S706 is performed.

S706. Traverse all physical partition segments corresponding to the logical partition segment to determine whether a size of a physical partition segment exceeds a preset upper or lower limit value of a physical partition segment size.

A determining result is classified into that if yes, S707 is performed; and if not, S708 is performed.

S707. If the physical partition segment is excessively large, record the excessively large physical partition segment.

S708. If the logical partition segment is excessively large, record the excessively large logical partition segment.

For example, if the size of the physical partition segment does not exceed the preset upper or lower limit value of the physical partition segment size, that is, sizes of all physical partition segments are smaller than the maximum physical partition segment size maxPart1, a determining result is that the logical partition segment is improper; and if the size of the physical partition segment exceeds the preset upper or lower limit value of the physical partition segment size, for example, a size of at least one physical partition segment is greater than or equal to the maximum physical partition segment size maxPart1, a determining result is that the physical partition segment is improper. An improper logical partition segment or physical partition segment is recorded.

S709. Determine whether the maxPart2/minPart2 is greater than an obliquity factor threshold.

If no improper physical partition segment or logical partition segment is found after the foregoing steps, an obliquity factor, that is, the maxPart2/minPart2, of two partition segments with the maximum logical partition segment size and the minimum logical partition segment size is computed, and whether a computation value of the obliquity factor is greater than an obliquity factor threshold is determined; and if not, that is, the obliquity factor is smaller than the obliquity factor threshold, it is considered that a data partition is proper and does not need to be adjusted; and if yes, S710 is performed.

S710. Record two logical partition segments in which obliquity occurs.

In this case, the determining result is that obliquity of a logical partition occurs, that is, a partition is improper, and logical partition adjustment is required.

Finally, a properness determining result is recorded, and a process of determining properness of data partitioning ends.

Figure 8:
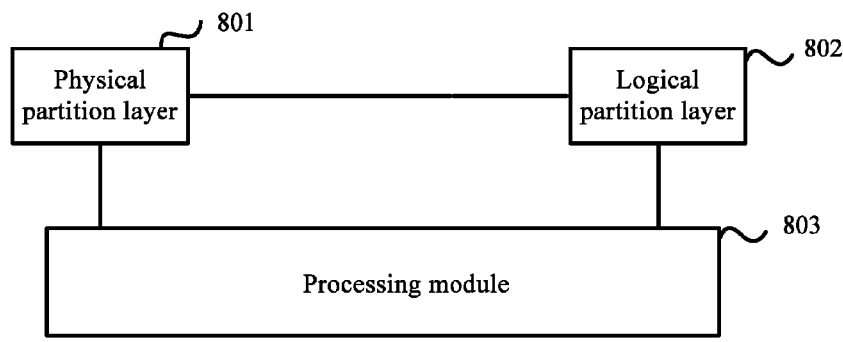
FIG. 8 is a schematic structural diagram of Embodiment 1 of a database system according to the present disclosure.

FIG. 8 is a schematic structural diagram of Embodiment 1 of a database system according to the present disclosure. As shown in FIG. 8, the system includes a physical partition layer 801 configured to store a physical partition segment of the database system, where the physical partition segment is a set of all data records in a partition table; a logical partition layer 802 configured to store a logical partition segment of the database system to provide logical partition information of the partition table, where the logical partition segment and the physical partition segment are mapped to each other using a mapping relationship; and a processing module 803 configured to receive a data operation instruction of a user, and determine a logical partition segment to which a data record that is requested for operation by the data operation instruction belongs; and determine, according to the data operation instruction and the mapping relationship, a physical partition segment that is corresponding to the determined logical partition segment and at the physical partition layer to perform an operation on the data record that is requested for operation by the data operation instruction.

In the database system according to the embodiment of the present disclosure, a data partition is divided into a physical partition layer and a logical partition layer; a logical partition segment and a corresponding physical partition segment are mapped to each other; and the logical partition layer can respond, by scanning the corresponding physical partition segment at the physical partition layer, to an operation that is performed on the corresponding physical partition segment by a query optimizer, an execution engine, and a partition management apparatus. In the embodiment of the present disclosure, using a hierarchy method for dividing a data partition into a physical partition layer and a logical partition layer, large-scale data migration caused by partition adjustment can be avoided, thereby reducing costs of partition adjustment.

Figure 9:
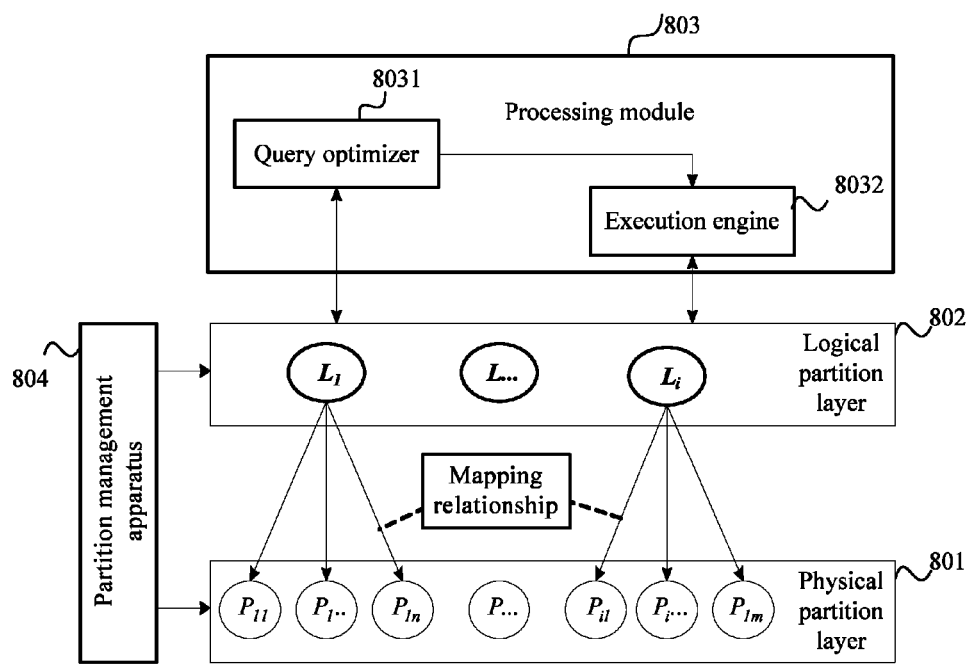
FIG. 9 is a schematic structural diagram of Embodiment 2 of a database system according to the present disclosure.

FIG. 9 is a schematic structural diagram of Embodiment 2 of a database system according to the present disclosure. As shown in FIG. 9, the physical partition layer 801, for example, includes $P_{11}, \ldots$ to $P_{1n}$, $P \ldots$, and $P_{i1}, \ldots$ to $P_{im}$ in FIG. 1; the logical partition layer 802, for example, includes $L_1, L_2, \ldots$ to $L_i$ in FIG. 1; the logical partition segment and a corresponding physical partition segment are mapped to each other using a mapping relationship; and a tuple at the logical partition layer and a tuple at the physical partition layer may be associated, and more specifically, may be associated using a tuple route (which is not shown in the figure).

Preferably, the system may further include a partition management apparatus 804 configured to perform properness determining on a current data partition according to collected partition information of the physical partition layer and collected partition information of the logical partition layer; and if it is determined that the current data partition is improper, adjust the logical partition segment or physical partition segment that is improper.

Further, the data operation instruction may be a query instruction; and correspondingly, the processing module 803 may include a query optimizer 8031 configured to receive the query instruction, determine a partition table-based query condition according to the query instruction, perform partition pruning on the logical partition segment to exclude a logical partition segment not involved in query, and generate an execution plan; and an execution engine 8032 configured to, according to the execution plan generated by the query optimizer 8031, trigger the logical partition layer to determine, according to the query instruction and the mapping relationship, the physical partition segment that is corresponding to the determined logical partition segment and at the physical partition layer to obtain a data record that is requested for query by the query instruction, and return, to a user, the obtained data record as a query result.

Preferably, the execution engine 8032 may be configured to cyclically obtain a data record from the logical partition segment according to the execution plan generated by the query optimizer and the query condition, and obtain, according to the mapping relationship, a data record from the physical partition segment corresponding to the determined logical partition segment; and perform data screening on the obtained data record according to information in the query instruction, and return, to the user, the data record that is obtained by the data screening and used as the query result.

Further, the data operation instruction may be an insert, delete or update instruction; and correspondingly, the processing module 803 may be configured to determine, according to the insert, delete or update instruction, a data record to be inserted, deleted or updated; compute, according to a set in which the data record is located, the logical partition segment to which the data record belongs, and a physical partition segment corresponding to the logical partition segment; and execute, according to the logical partition layer, an insert, delete or update operation on a data record within the physical partition segment obtained by the computing.

Figure 10:
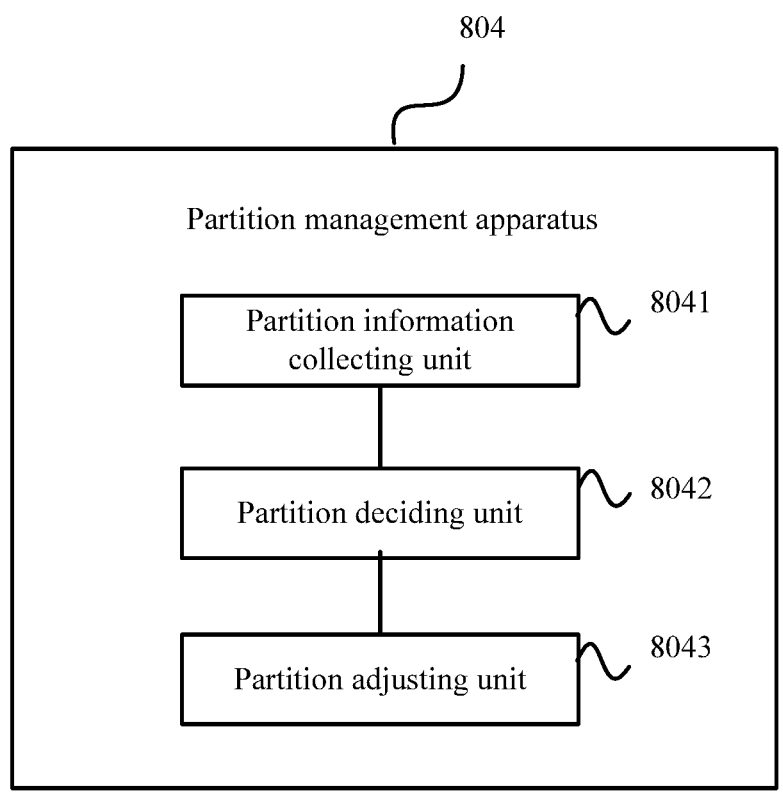
FIG. 10 is a schematic structural diagram of a partition management apparatus in a database system according to the present disclosure.

FIG. 10 is a schematic structural diagram of a partition management apparatus in a database system according to the present disclosure. As shown in FIG. 9, preferably, the partition management apparatus 804 may include a partition information collecting unit 8041 configured to collect database system running information related to partition adjustment, where the database system running information includes data information of tuples of both a logical partition and a physical partition, a data size of the logical partition segment and a data size of the physical partition segment, an SQL statement submitted to a database server by a peripheral and an execution frequency, and performance of executing an SQL statement by a database server; a partition deciding unit 8042 configured to determine, using the database system running information, whether a current data partition is proper; and when it is determined that the current data partition is improper, replan a partitioning scheme; and a partition adjusting unit 8043 configured to adjust the logical partition segment and/or the physical partition segment according to the replanned partitioning scheme.

Preferably, the partition deciding unit 8042 is configured to determine, according to an eigenvalue in the database system running information collected by the partition information collecting unit 8041, whether the current data partition is proper, where the eigenvalue includes a data size upper limit of a partition segment, and an obliquity factor threshold; and if the eigenvalue exceeds a preset value of a corresponding eigenvalue, determine that the current data partition is improper.

Preferably, the partition adjusting unit 8043 is configured to adjust, according to the replanned partitioning scheme, the logical partition layer by performing addition, deletion, combination or splitting on the logical partition segment, and/or perform adjustment by splitting the physical partition segment.

Preferably, one logical partition segment corresponds to one or more physical partition segments.

In the foregoing embodiments, a data partitioning system automatically selects a proper partitioning policy and a proper partition granularity for a partition table, thereby avoiding quite low partitioning performance due to an improper partition used by a DBA; with the increase of data amount, the data partitioning system automatically adjusts a partition according to a data change, and an improper partition can be found and adjusted in time, without intervention of the DBA. In addition, the data partitioning system uses a hierarchy idea of a physical partition and a logical partition, thereby avoiding large-scale data migration caused by partition adjustment in most cases, and greatly reducing costs of partition adjustment; and automatic partition adjustment of the data partition system frees the DBA from complex partitioning management, and properness of an adjusted partitioning policy can be ensured because a basis for partition adjustment is real-time database system running information. Moreover, long-term verification is not required; and because a hierarchical data partition is introduced, a performance advantage of a storage cluster system can be fully used, and a part below a logical partition layer is implemented on the storage cluster, which greatly improves the query efficiency.

In conclusion, in the database management method and system according to the embodiments of the present disclosure, a data partition is divided into a physical partition layer and a logical partition layer; the logical partition segment and a corresponding physical partition segment are mapped to each other; and the logical partition layer can respond, by scanning the corresponding physical partition segment at the physical partition layer, to an operation that is performed on the corresponding physical partition segment by a query optimizer, an execution engine, and a partition management apparatus. In the embodiments of the present disclosure, a partition may be automatically adjusted according to a data change, which can improve properness of partitioning and management performance of a database system.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally it should be noted that, the foregoing embodiments are merely intended for describing the technical solutions of the present disclosure rather than limiting the present disclosure. Although the embodiments of the present disclosure are described in detail with reference to the foregoing embodiments, persons of ordinary skill in the art should understand that they may still make modifications to the technical solutions described in the foregoing embodiments, or make equivalent replacements to a part or all of the technical features thereof, as long as these modifications or replacements do not make the corresponding technical solution depart from the scope of the technical solutions of the embodiments of the present disclosure.

What is claimed is:

1. A database management method, comprising;
dividing, by a database system, a data partition into a physical partition layer and a logical partition layer, wherein the physical partition layer is configured to store a physical partition segment of the database system, wherein the physical partition segment is a set of all data records in a partition table, wherein the logical partition layer is configured to store a logical partition segment of the database system to provide logical partition information of the partition table, and wherein the logical partition segment and the physical partition segment are mapped to each other using a mapping relationship;
receiving, by the database system, a query instruction;
determining a logical partition segment to which a data record queried by the query instruction belongs;
determining a partition table-based query condition according to the query instruction;
performing partition pruning on the logical partition segment to exclude a logical partition segment not involved in query;
generating an execution plan;
determining, by the database system according to the execution plan, the query instruction, and the mapping relationship, a physical partition segment that corresponds to the determined logical partition segment to obtain the data record queried by the query instruction at the physical partition layer; and
returning the obtained data record as a query result.

2. The method according to claim 1, further comprising:
performing, by the database system, properness determining on the data partition according to partition information of the physical partition layer and partition information of the logical partition layer; and
adjusting, by the database system, a logical partition segment or physical partition segment that is improper when the data partition is improper.

3. The method according to claim 1, wherein determining, by the database system according to the execution plan, the query instruction, and the mapping relationship, the physical partition segment that corresponds to the determined logical partition segment to obtain the data record queried by the query operation, at the physical partition layer, comprises:
cyclically obtaining, by the database system, a data record from the logical partition segment according to the execution plan and the query condition;
obtaining, by the database system, a data record from the physical partition segment corresponding to the determined logical partition segment according to the mapping relationship;
performing, by the database system, data screening on the obtained data record from the physical partition segment according to information in the query instruction; and
returning, the data record that is obtained by the data screening as the query result.

4. A database management method, comprising:
dividing, by a database system, a data partition into a physical partition layer and a logical partition layer, wherein the physical partition layer is configured to store a physical partition segment of the database system, wherein the physical partition segment is a set of all data records in a partition table, wherein the logical partition layer is configured to store a logical partition segment of the database system to provide logical partition information of the partition table, and wherein the logical partition segment and the physical partition segment are mapped to each other using a mapping relationship;
collecting, by the database system, database system running information related to partition adjustment, wherein the database system running information comprises data information of tuples of both a logical partition and a physical partition, a data size of the logical partition segment and a data size of the physical partition segment, a structured query language (SQL) statement submitted to a database server by a peripheral and an execution frequency, and performance of executing an SQL statement by a database server;

determining, by the database system, according to the database system running information, whether the data partition is proper;

replanning, by the database system, a partitioning scheme when it is determined that the data partition is improper; and adjusting, by the database system, at least one of the logical partition segment and the physical partition segment according to the replanned partitioning scheme.

5. The method according to claim 4, wherein determining, by the database system, according to the database system running information, whether the data partition is proper comprises:

determining, by the database system according to an eigenvalue in the database system running information, whether the data partition is proper, wherein the eigenvalue comprises a data size upper limit of a partition segment and an obliquity factor threshold; and determining that the data partition is improper when the eigenvalue exceeds a preset value of a corresponding eigenvalue.

6. The method according to claim 4, wherein adjusting, by the database system, at least one of the logical partition segment and the physical partition segment according to the replanned partitioning scheme comprises at least one of:

adjusting, by the database system according to the replanned partitioning scheme, the logical partition layer by performing addition, deletion, combination or splitting on the logical partition segment; and adjusting, by the database system according to the replanned partitioning scheme, the physical partition layer by splitting the physical partition segment.

7. The method according to claim 4, wherein one logical partition segment corresponds to one or more physical partition segments.

8. A database system, comprising:

a storage medium; and a processor coupled to the storage medium, wherein the storage medium is configured to store a data partition, wherein the data partition is divided into a physical partition layer and a logical partition layer, wherein the physical partition layer is configured to store a physical partition segment of the database system, wherein the physical partition segment is a set of all data records in a partition table, wherein the logical partition layer is configured to store a logical partition segment of the database system to provide logical partition information of the partition table, wherein the logical partition segment and the physical partition segment are mapped to each other using a mapping relationship, and wherein the processor is configured to:

receive a query instruction;

determine a logical partition segment to which a data record queried by the query instruction belongs;

determine a partition table-based query condition according to the query instruction;

perform partition pruning on the logical partition segment to exclude a logical partition segment not involved in the query;

generate an execution plan;

determine, according to the execution plan, according to the query instruction and the mapping relationship, a physical partition segment that corresponds to the determined logical partition segment to obtain the data record queried by the query instruction, at the physical partition layer; and return, the obtained data record as a query result.

9. The system according to claim 8, further comprising a partition management apparatus configured to:

perform properness determining on the data partition according to collected partition information of the physical partition layer and collected partition information of the logical partition layer; and adjust a logical partition segment or a physical partition segment that is improper when the data partition is improper.

10. The system according to claim 8, wherein when the processor is configured to determine the physical partition segment that is corresponding to the determined logical partition segment to obtain the data record queried by the query instruction, the processor is further configured to:

cyclically obtain a data record from the logical partition segment according to the execution plan generated by the query optimizer and the query condition;

obtain, according to the mapping relationship, a data record from the physical partition segment corresponding to the determined logical partition segment;

perform data screening on the obtained data record from the partition segment according to information in the query instruction; and return the data record that is obtained by the data screening as the query result.

11. A database system, comprising:

a storage medium; and a processor, wherein the storage is configured to store a data partition, wherein the data partition is divided into a physical partition layer and a logical partition layer, wherein the physical partition layer is configured to store a physical partition segment of the database system, wherein the physical partition segment is a set of all data records in a partition table, wherein the logical partition layer is configured to store a logical partition segment of the database system to provide logical partition information of the partition table, wherein the logical partition segment and the physical partition segment are mapped to each other using a mapping relationship, and wherein the processor is configured to:

collect database system running information related to partition adjustment, wherein the database system running information comprises data information of tuples of both a logical partition and a physical partition, a data size of the logical partition segment and a data size of the physical partition segment, a structured query language (SQL) statement submitted to a database server by a peripheral and an execution frequency, and performance of executing an SQL statement by a database server;

determine, according to the database system running information, whether the data partition is proper;

replan a partitioning scheme when it is determined that the data partition is improper; and adjust at least one of the logical partition segment and the physical partition segment according to the replanned partitioning scheme.

12. The system according to claim 11, wherein when the processor is configured to determine whether the data partition is proper, the processor is further configured to:

determine, according to an eigenvalue in the database system running information collected by the partition information collecting unit, whether the data partition is proper, wherein the eigenvalue comprises a data size upper limit of a partition segment and an obliquity factor threshold; and determine that the data partition is improper when the eigenvalue exceeds a preset value of a corresponding eigenvalue.

13. The system according to claim 11, wherein when the processor is configured to adjust at least one of the logical partition segment and the physical partition segment, the processor is further configured to:

adjust, according to the replanned partitioning scheme, the logical partition layer by performing addition, deletion, combination or splitting on the logical partition segment; and adjust, according to the replanned partitioning scheme, the physical partition layer by splitting the physical partition segment.

14. The system according to claim 11, wherein one logical partition segment corresponds to one or more physical partition segments.

* * * * *